United States Patent
Aminaka

(10) Patent No.: US 10,129,920 B2
(45) Date of Patent: Nov. 13, 2018

(54) CONTROL APPARATUS, RADIO COMMUNICATION DEVICE, AND METHOD THEREFOR

(71) Applicant: NEC Corporation, Tokyo (JP)

(72) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/514,237

(22) PCT Filed: Jul. 15, 2015

(86) PCT No.: PCT/JP2015/003572
§ 371 (c)(1),
(2) Date: Mar. 24, 2017

(87) PCT Pub. No.: WO2016/175848
PCT Pub. Date: May 19, 2016

(65) Prior Publication Data
US 2017/0280493 A1 Sep. 28, 2017

(30) Foreign Application Priority Data
Nov. 10, 2014 (JP) .................. 2014-228041

(51) Int. Cl.
*H04W 4/00* (2018.01)
*H04W 76/14* (2018.01)
*H04W 28/24* (2009.01)
*H04W 64/00* (2009.01)

(52) U.S. Cl.
CPC .......... *H04W 76/14* (2018.02); *H04W 28/24* (2013.01); *H04W 64/00* (2013.01)

(58) Field of Classification Search
CPC ................ H04W 8/005; H04W 92/18
(Continued)

(56) References Cited

U.S. PATENT DOCUMENTS

| 2006/0165035 A1 | 7/2006 | Chandra et al. |
| 2012/0195263 A1 | 8/2012 | Chandra et al. |

(Continued)

FOREIGN PATENT DOCUMENTS

| JP | H09-307494 A | 11/1997 |
| JP | 2005-033536 A | 2/2005 |

(Continued)

OTHER PUBLICATIONS

International Search Report corresponding to PCT/JP2015/003572 dated Sep. 15, 2015 (2 pages).

(Continued)

*Primary Examiner* — Kiet Doan
(74) *Attorney, Agent, or Firm* — Wilmer Cutler Pickering Hale and Dorr LLP

(57) ABSTRACT

A control apparatus (5) operates to: (a) receive from a first radio terminal (1), through a public land mobile network (100), a start request for ProSe communication (103) to be performed between the first radio terminal (1) and a second radio terminal (2) without communicating through the public land mobile network (100); and (b) receive a QoS requirement regarding the ProSe communication (103) from the second radio terminal (102). This contributes, for example, to ensuring QoS in inter-terminal direct communication required by a requested radio terminal, which has been requested by a requesting radio terminal to perform the inter-terminal direct communication.

12 Claims, 9 Drawing Sheets

(58) Field of Classification Search
USPC ..... 455/41.2, 509, 426.1, 406; 370/328, 338
See application file for complete search history.

(56) References Cited

U.S. PATENT DOCUMENTS

| | | | |
|---|---|---|---|
| 2013/0287012 A1 | 10/2013 | Pragada et al. | |
| 2013/0288668 A1* | 10/2013 | Pragada | H04W 12/06 455/426.1 |
| 2013/0303088 A1 | 11/2013 | Watfa et al. | |
| 2014/0010209 A1* | 1/2014 | Hakola | H04W 24/02 370/336 |
| 2014/0044115 A1 | 2/2014 | Chandra et al. | |
| 2014/0256334 A1 | 9/2014 | Kazmi et al. | |
| 2015/0139087 A1* | 5/2015 | Luft | H04W 52/0251 370/329 |
| 2016/0100285 A1* | 4/2016 | Zhu | H04W 4/023 455/426.1 |

FOREIGN PATENT DOCUMENTS

| | | |
|---|---|---|
| JP | 2010-166505 A | 7/2010 |
| KR | 10-2014-0106561 A | 9/2014 |
| WO | WO-2013/162196 A1 | 10/2013 |
| WO | WO-2013/163595 A2 | 10/2013 |
| WO | WO-2013/163599 A2 | 10/2013 |
| WO | WO-2013/170134 A2 | 11/2013 |

OTHER PUBLICATIONS

3GPP TS 22.278 V12.4.0, Service requirements for the Evolved Packet System (EPS) (Release 12) (Sep. 2013) pp. 1-45.
3GPP TS 23.303 V12.1.0, Proximity-based services (ProSe), Stage 2 (Release 12) (Jun. 2014) pp. 1-60.
Korean Office Action issued by the Korean Intellectual Property Office for Korean Application No. 2017-7008333 dated Feb. 19, 2018 (10 pages).
Extended European Search Report issued by the European Patent Office for European Application No. 15859987.8 dated Jul. 11, 2018 (7 pages).
LG Electronics, "Solution for EPC-level ProSe Discovery Request containing ProSe Communication Request," SA WG2 Meeting 52#98, S2-132651, Agenda Item 6.4, Valencia, Spain, Jul. 15-19, 2013 (3 pages).

* cited by examiner

CONTROL APPARATUS, RADIO COMMUNICATION DEVICE, AND METHOD THEREFOR

CROSS-REFERENCE TO RELATED APPLICATIONS

This application is a national stage application of International Application No. PCT/JP2015/003572 entitled "Control Apparatus, Radio Communication Device, and Method Therefor" filed on Jul. 15, 2015, which claims priority to Japanese Application No. 2014-228041 filed on Nov. 10, 2014, the disclosures of which are hereby incorporated by reference in their entirety.

TECHNICAL FIELD

The present application relates to Proximity Service (ProSe) communication performed by radio terminals, and more particularly to a start control for inter-terminal direct communication.

BACKGROUND ART

3GPP Release 12 specifies Proximity-based services (ProSe) (see, for example, Non-patent Literature 1 and 2). The ProSe includes ProSe discovery and ProSe direct communication. The ProSe discovery identifies that radio terminals capable of performing ProSe direct communication (i.e., ProSe-enabled UEs) are in proximity of each other. In an example, the ProSe discovery can be performed through a procedure in which a ProSe-enabled UE detects another ProSe-enabled UE by using only capability of a radio communication technology (e.g., Evolved Universal Terrestrial Radio Access (E-UTRA) technology) possessed by these two UEs. In another example, the ProSe discovery can be performed by a radio access network (E-UTRA Network (E-UTRAN)) or a core network (Evolved Packet Core (EPC)).

The ProSe direct communication enables establishment of communication paths between two or more ProSe-enabled UEs that are in direct communication range after the ProSe discovery procedure is performed. In other words, the ProSe direct communication enables a ProSe-enabled UE to communicate with another ProSe-enabled UE directly without communicating through a base station (eNodeB). The ProSe direct communication may be performed by using a radio communication technology that is also used to access a base station (eNodeB) (i.e., E-UTRA technology) or by using a wireless local area network (WLAN) radio technology (i.e., IEEE 802.11 radio technology).

In 3GPP Release 12, a ProSe function communicates with a ProSe-enabled UE through a Public Land Mobile Network (PLMN) and assists the ProSe discovery and the ProSe direct communication. The ProSe function is a logical function that is used for PLMN-related operations required for the ProSe. The ProSe function provides functionality including, for example, (a) communication with third-party applications (ProSe Application Server), (b) authentication of UEs for ProSe discovery and ProSe direct communication, (c) transmission of configuration information (e.g., designation of radio resources and transmission power) for ProSe discovery and ProSe direct communication to UEs, and (d) provision of EPC-level ProSe discovery. The ProSe function may be implemented in one or more network nodes or entities. In this specification, one or more network nodes or entities that implement the ProSe function are referred to as a "ProSe function entity" or a "ProSe function server".

The ProSe direct communication in 3GPP Release 12 is one example of the inter-terminal direct communication. Similarly to the ProSe in the 3GPP Release 12, inter-terminal direct communication in a public land mobile network (PLMN) includes the discovery phase and direct communication phase that are assisted by a function or a node (e.g., ProSe function) located in the network. The inter-terminal direct communication is performed between two or more radio terminals in proximity of each other without communicating through any network node (e.g., a base station). The inter-terminal direct communication is also referred to as "device-to-device (D2D) communication" or "peer-to-peer communication". The ProSe direct communication is an example of the inter-terminal direct communication and is also referred to as "ProSe communication".

The term "public land mobile network" in this specification indicates a wide-area radio infrastructure network, and means a multiple-access type mobile communication system. The multiple-access mobile communication system enables mobile terminals to perform radio communication substantially simultaneously by sharing radio resources including at least one of time resources, frequency resources, and transmission power resources among the mobile terminals. Typical examples of multiple-access technology include Time Division Multiple Access (TDMA), Frequency Division Multiple Access (FDMA), Code Division Multiple Access (CDMA), Orthogonal Frequency Division Multiple Access (OFDMA), and any combination thereof. The public land mobile network includes a radio access network and a core network. Examples of the public land mobile network include a 3GPP Universal Mobile Telecommunications System (UMTS), a 3GPP Evolved Packet System (EPS), a 3GPP2 CDMA2000 system, a Global System for Mobile communications (GSM (Registered Trademark))/General packet radio service (GPRS) system, a WiMAX system, and a mobile WiMAX system. The EPS includes a Long Term Evolution (LTE) system and an LTE-Advanced system.

Patent Literature 1 shows an example in which whether a mobile switching center determines whether to start inter-terminal direct communication. In Patent Literature 1, a caller-side radio terminal performs a calling process and transmits calling information. The calling information includes an identifier (e.g., a telephone number) of a callee-side radio terminal. The mobile switching center receives the calling information and checks whether or not the caller-side radio terminal and the callee-side radio terminal are present in the same base station area (communication area) or in base station areas adjacent to each other. If these two terminals are present in the same communication area or in adjacent communication areas, the mobile switching center then notifies the caller-side terminal that inter-terminal direct communication is possible. If not so, the mobile switching center provides normal communication between these two terminals through a network. That is, in Patent Literature 1, the location of the callee-side radio terminal (i.e., the communication area in which the terminal is present) is taken into consideration in the determination whether to activate inter-terminal direct communication.

Patent Literature 2 discloses that a radio network node (e.g., eNodeB) receives, from a radio terminal, internal resource status information indicating a current internal resource status of this radio terminal and takes the internal resource status into consideration in determining whether the radio terminal can perform D2D communication (inter-terminal direct communication). The internal resource status mentioned in Patent Literature 2 relates to, for example, hardware resources, software resources, and radio resources. Specific examples of the internal resource status regarding hardware resources include remaining or current resource usage of one or more of: transmit power; battery power; overall memory; overall processor; baseband memory; baseband processor and buffer status. Specific examples of the internal resource status regarding software resources include Operating System (OS) capabilities (the number of simultaneously ongoing processes, number of files). Specific examples of the internal resource status regarding radio resources include radio channel, physical channel, time and frequency resource, time slot, and CDMA channelization codes. That is, in Patent Literature 2, the current internal resource statuses of both a requesting radio terminal, which has requested the direct communication, and a requested radio terminal, which has been requested to perform the direct communication, are taken into consideration in determining whether to start D2D communication (inter-terminal direct communication).

Patent Literature 3 and 4 disclose that a request for inter-terminal direct communication that is transmitted from a radio terminal to a network includes Quality of Service (QoS) information. This QoS information indicates QoS required by the requesting radio terminal, which has requested the direct communication, for the inter-terminal direct communication.

CITATION LIST

Patent Literature

Patent Literature 1: Japanese Unexamined Patent Application Publication No. 2005-33536
Patent Literature 2: United States Patent Application Publication No. 2014/0256334
Patent Literature 3: United States Patent Application Publication No. 2013/0288668
Patent Literature 4: International Patent Publication No. WO2013/162196

Non Patent Literature

Non-patent Literature 1: 3GPP TS 22.278 V 12.4.0 (2013-09), "3rd Generation Partnership Project; Technical Specification Group Services and System Aspects; Service requirements for the Evolved Packet System (EPS) (Release 12)", September 2013
Non-patent Literature 2: 3GPP TS 23.303 V12.1.0 (2014-06), "3rd Generation Partnership Project; Technical Specification Group Services and System Aspects; Proximity-based services (ProSe); Stage 2 (Release 12)", June 2014

SUMMARY OF INVENTION

Technical Problem

As described above, Patent Literature 2 discloses that a current internal resource status of a radio terminal is taken into consideration in determining whether to start D2D communication (inter-terminal direct communication). The internal resource status relates to, for example, hardware resources, software resources, and radio resources.

As described above, Patent Literature 3 and 4 disclose that a request for inter-terminal direct communication that is transmitted from a radio terminal to a network includes Quality of Service (QoS) information. However, in the procedure to start inter-terminal direct communication disclosed in Patent Literature 3 and 4, the QoS required by the requested radio terminal, which has been requested to perform D2D communication, for the D2D communication is not taken into consideration. Therefore, there is a possibility that QoS (e.g., throughput or a transmission delay) required by the requested radio terminal, which has been requested to perform the D2D communication, for the D2D communication cannot be ensured. Note that, Patent Literature 1 and 2 also provides no disclosure as to a configuration or a method for solving this problem.

Therefore, one of the objects to be attained by embodiments disclosed herein is to provide an apparatus, a method, and a program that contribute to ensuring, in inter-terminal direct communication, QoS required by a requested radio terminal, which has been requested by a requesting radio terminal to perform this inter-terminal direct communication.

Solution to Problem

In a first aspect, a method performed by a control apparatus includes (a) receiving from a first radio terminal, through a public land mobile network, a start request for ProSe communication that is to be performed between the first radio terminal and a second radio terminal without communicating through the public land mobile network, and (b) receiving a QoS requirement regarding the ProSe communication from the second radio terminal.

In a second aspect, a control apparatus includes at least one processor. The at least one processor is configured to: receive from a first radio terminal, through a public land mobile network, a start request for ProSe communication that is to be performed between the first radio terminal and a second radio terminal without communicating through the public land mobile network; and receive a QoS requirement regarding the ProSe communication from the second radio terminal.

In a third aspect, a method performed by a radio communication device includes (a) receiving a first message from a control apparatus through a public land mobile network, and (b) transmitting a QoS requirement regarding ProSe communication to the control apparatus in response to the first message. Here, the first message is transmitted from the control apparatus in response to receiving, by the control apparatus from a first radio terminal, a start request for the ProSe communication that is to be performed between the first radio terminal and the radio communication device without communicating through the public land mobile network.

In a fourth aspect, a radio communication device includes at least one processor. The at least one processor is configured to receive a first message from a control apparatus through a public land mobile network and transmit a QoS requirement regarding ProSe communication to the control apparatus in response to the first message. Here, the first message is transmitted from the control apparatus in response to receiving, by the control apparatus from a first radio terminal, a start request for the ProSe communication that is to be performed between the first radio terminal and the radio communication device without communicating through the public land mobile network.

In a fifth aspect, a program includes a set of instructions (software codes) that, when loaded into a computer, causes the computer to perform a method according to the above-described first aspect.

In a sixth aspect, a program includes a set of instructions (software codes) that, when loaded into a computer, causes the computer to perform a method according to the above-described third aspect.

Advantageous Effects of Invention

According to the above-described aspects, it is possible to provide an apparatus, a method, and a program for contributing to ensuring, in inter-terminal direct communication, QoS required by a requested radio terminal, which has been requested by a requesting radio terminal to perform this inter-terminal direct communication.

DESCRIPTION OF EMBODIMENTS

Specific embodiments are explained hereinafter in detail with reference to the drawings. The same or corresponding elements are denoted by the same symbols throughout the drawings, and duplicated explanations are omitted as necessary for the sake of clarity.

Embodiments described below will be explained mainly using specific examples with regard to an Evolved Packet System (EPS). However, these embodiments are not limited to being applied to the EPS and may also be applied to other mobile communication networks or systems such as a 3GPP (UMTS), a 3GPP2 CDMA2000 system, a GSM/GPRS system, and a WiMAX system.

First Embodiment

Figure 1:
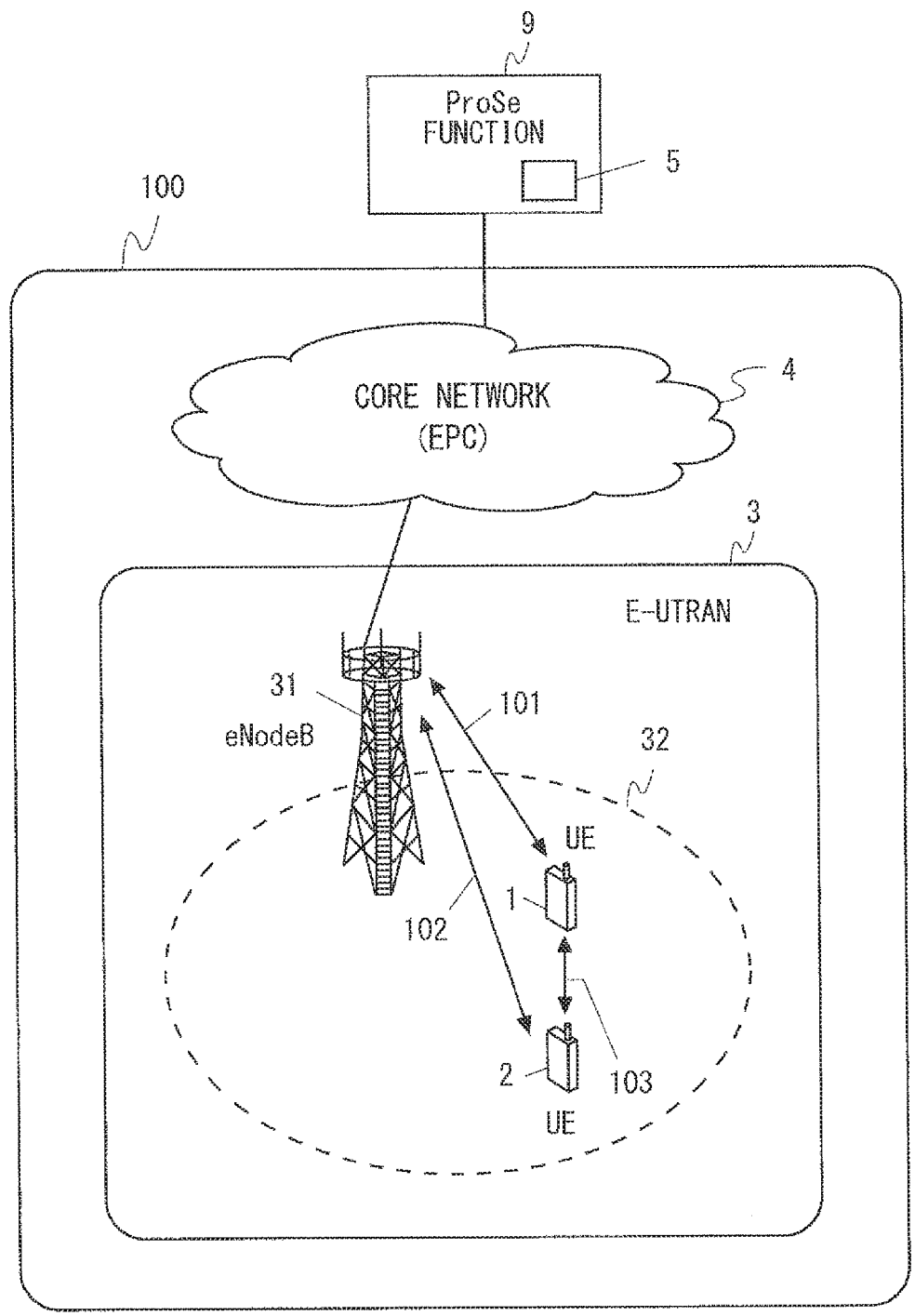
FIG. 1 shows a configuration example of a public land mobile network according to some embodiments.
Figure 2:
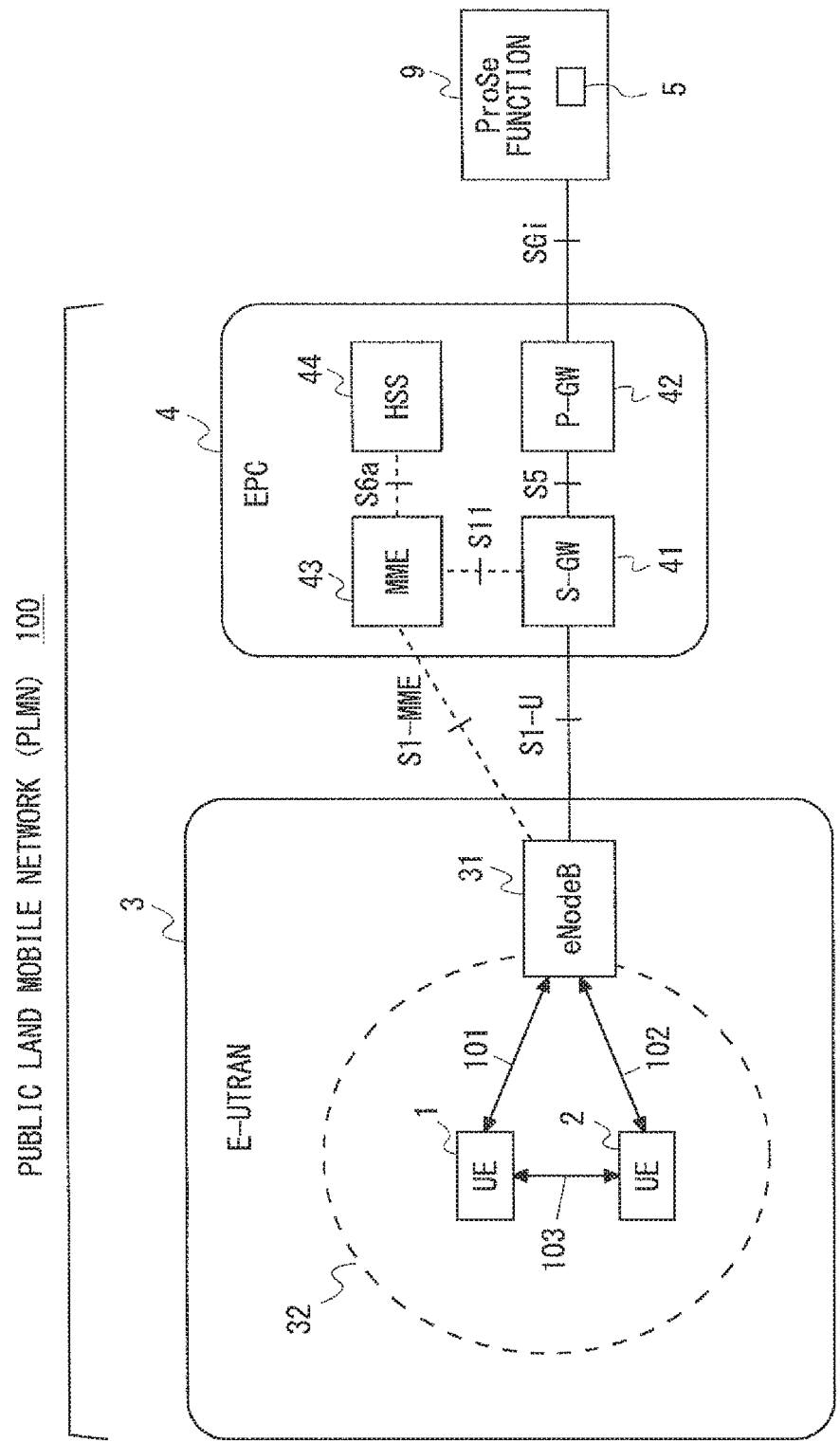
FIG. 2 shows a configuration example of a public land mobile network according to some embodiments.

FIGS. 1 and 2 show a configuration example of a PLMN 100 according to this embodiment. Both a UEs 1 and a UE 2 are radio terminals capable of performing ProSe (i.e., ProSe-enabled UEs), and they can establish a ProSe communication path 103 and perform ProSe direct communication (or ProSe communication, inter-terminal direct communication, or D2D communication) between them. The ProSe direct communication between the UE 1 and the UE 2 may be performed by using a radio communication technology that is also used to access a base station (eNodeB) (i.e., E-UTRA technology) or by using a WLAN radio technology (IEEE 802.11 radio technology).

An eNodeB 31 is an entity located in a radio access network (i.e., E-UTRAN) 3, manages a cell 32 and is able to perform communication (101 and 102) with the UEs 1 and 2 on frequencies licensed to the E-UTRAN 3 by using the E-UTRA technology.

A core network (i.e., EPC) 4 includes a plurality of user-plane entities (e.g., a Serving Gateway (S-GW) 41 and a Packet Data Network Gateway (P-GW) shown in FIG. 2) and a plurality of control-plane entities (e.g., a Mobility Management Entity (MME) 43 and a Home Subscriber Server (HSS) 44 shown in FIG. 2). The user-plane entities relay user data of the UEs 1 and 2 between the E-UTRAN 3 and an external network (Packet Data Network (PDN)). The control-plane entities perform various types of control for the UEs 1 and 2 including mobility management, session management (bearer management), and billing management.

In order to start ProSe direct communication (103) in the cell 32, each of the UE 1 and the UE 2 attaches to the core network (i.e., EPC) 4 through the eNodeB 31, establishes a Packet Data Network (PDN) connection for communicating with a ProSe function entity 9, and transmits and receives ProSe control signaling to and from the ProSe function entity 9 through the E-UTRAN 3 and the EPC 4. The UE 1 and the UE 2 may use a ProSe discovery service provided by the ProSe function entity 9. The UE 1 and the UE 2 may receive from the ProSe function entity 9 a message indicating permission for the UEs 1 and 2 to activate ProSe discovery or ProSe direct communication. The UE 1 and the UE 2 may receive, from the ProSe function entity 9, configuration information for ProSe discovery or ProSe direct communication in the cell 32. Note that an interface (PC3 reference point) between the ProSe function and each of the UEs 1 and 2 depends on the user plane of the E-UTRAN 3 and the EPC 4, and accordingly the ProSe control signaling is transferred on this user plane. Therefore, as shown in FIG. 2, the ProSe function entity 9 communicates with the EPC 4 (i.e., the P-GW 42) through the SGi reference point, which is a reference point between a PDN Gateway (P-GW) 42 and a PDN.

The UE 1 and the UE 2 are able to perform ProSe direct communication within a UE group including a plurality of UEs. Although FIGS. 1 and 2 show only two UEs 1 and 2, the UE 1 and the UE 2 may perform ProSe direct communication within a UE group including three or more UEs.

The following describes an operation of a control apparatus 5 that is performed when ProSe communication between the UE 1 and the UE 2 is set up. In this example, a case in which ProSe communication between the UE 1 and the UE 2 is started in response to a request from the UE 1 is explained. That is, the UE 1 is a "requesting UE" that has requested initiation of ProSe communication and the UE 2 is a "requested UE" that has been requested to start the ProSe communication. The UE 1 (requesting UE) may also be referred to as a "sender UE" or a "caller UE" and the UE 2 (requested UE) may also be referred to as a "receiver UE" or a "callee UE".

In an example, the control apparatus 5 may be located in a radio access network (e.g., the E-UTRAN 3) and, more specifically, integrally located with a radio resource control entity (e.g., a base station or a base station controller) in the radio access network. In the case of E-UTRAN, the control apparatus 5 may be located in the eNodeB 31. In the case of UTRAN, the control apparatus 5 may be located in a Radio Network Controller (RNC). In another example, the control apparatus 5 may be located in a core network (e.g., the EPC 4) and, more specifically, integrally located with an existing core-network entity (e.g., MME 43 or HSS 44). In still another example, the control apparatus 5 may be located outside the E-UTRAN 3 and the EPC 4. The control apparatus 5 may be integrally located with the ProSe function entity 9 as shown in FIGS. 1 and 2.

Figure 3:
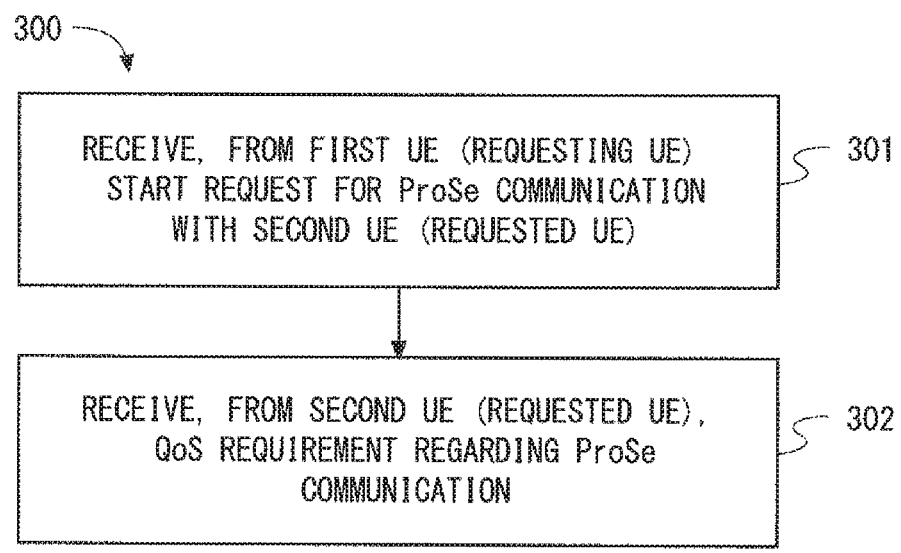
FIG. 3 is a flowchart showing an example of processes performed by a control apparatus according to a first embodiment.

FIG. 3 is a flowchart showing an example (300) of processes performed by the control apparatus 5. In Block 301, the control apparatus 5 receives from the UE 1 (requesting UE) a start request for ProSe communication between the UE 1 (requesting UE) and the UE 2 (requested UE). The start request for ProSe communication transmitted by the UE 1 may be a request for a data service with the UE 2, a request for a telephone call with the UE 2, a request for setting up ProSe discovery, a request for setting up a ProSe direct communication path, a request for allocating a radio resource for a ProSe direct communication path, or any combination thereof.

In Block 302, the control apparatus 5 receives a QoS requirement regarding the ProSe communication from the UE 2 (requested UE). This QoS requirement may be a QoS requirement required by the UE 2 to perform the ProSe communication. The QoS requirement relates to, for example, at least one of an amount of transmission data, throughput, and a transmission delay. In some implementations, this QoS requirement may be requested by a service or an application that uses the ProSe communication in the UE 2. In other words, the QoS requirement may be requested by application software (i.e., program(s)) that is installed in the UE 2 and uses ProSe communication between the UE 1 and the UE 2. The application software that uses ProSe communication is, for example, instant messaging (text chat), voice chat, video chat, or an online game.

The control apparatus 5 may use the QoS requirement received from the UE 2 (requested UE) in Block 302 in order to determine whether to set up the ProSe communication requested by the UE 1 (requesting UE). Here, the setup of the ProSe communication may be a setup of ProSe discovery, a setup of ProSe direct communication, allocation of a radio resource for ProSe direct communication, assistance in establishing a ProSe communication path, or any combination thereof.

That is, when setting up the ProSe communication, the control apparatus 5 according to this embodiment can take account of the QoS requirement requested by a service or an application that uses the ProSe communication in the UE 2 (requested UE). The control apparatus 5 can therefore contribute to ensuring, in ProSe communication, QoS required by the UE 2 (requested UE), which has been requested by the UE 1 (requesting UE) to perform this ProSe communication.

Figure 4:
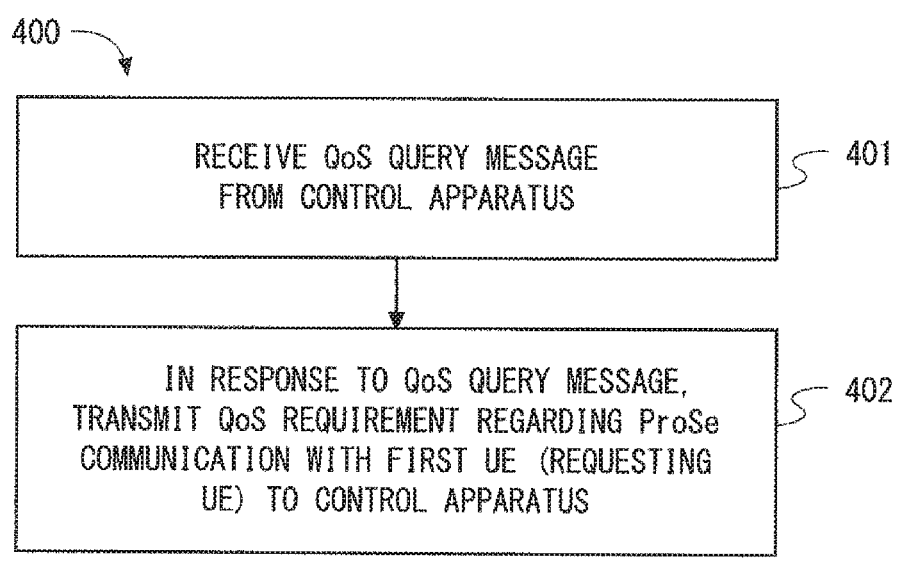
FIG. 4 is a flowchart showing an example of processes performed by a control apparatus according to the first embodiment.

FIG. 4 is a flowchart showing an example (processes 400) of processes performed by the UE 2 (requested UE) according to this embodiment. In Block 401, the UE 2 receives a QoS query message from the control apparatus 5. This QoS query message is transmitted from the control apparatus 5 in response to receiving, by the control apparatus 5 from the UE 1 (requesting UE), a start request for ProSe communication between the UE 1 and the UE 2. In Block 402, in response to the QoS query message, the UE 2 transmits to the control apparatus 5 a QoS requirement regarding the ProSe communication with the UE 1 (requesting UE).

In some implementations, the control apparatus 5 may transmit the QoS query message to the UE 1 upon receiving a ProSe start request from the UE 1 (requesting UE). Alternatively, the control apparatus 5 may periodically or aperiodically receive from the UE 2 the QoS requirement that the UE 2 requires for the ProSe communication, irrespective of the ProSe start request.

Applying the procedure shown in FIG. 4, the UE 2 serving as the requesting UE can notify the control apparatus 5 of its QoS requirement. The UE 2 can therefore contribute to ensuring, in ProSe communication, QoS required by the UE 2 (requested UE), which has been requested by the UE 1 (requesting UE) to perform this ProSe communication.

Second Embodiment

This embodiment provides a specific example of the process for setting up ProSe communication explained in the first embodiment. A configuration example of a public land mobile network according to this embodiment is similar to that shown in FIGS. 1 and 2.

Figure 5:
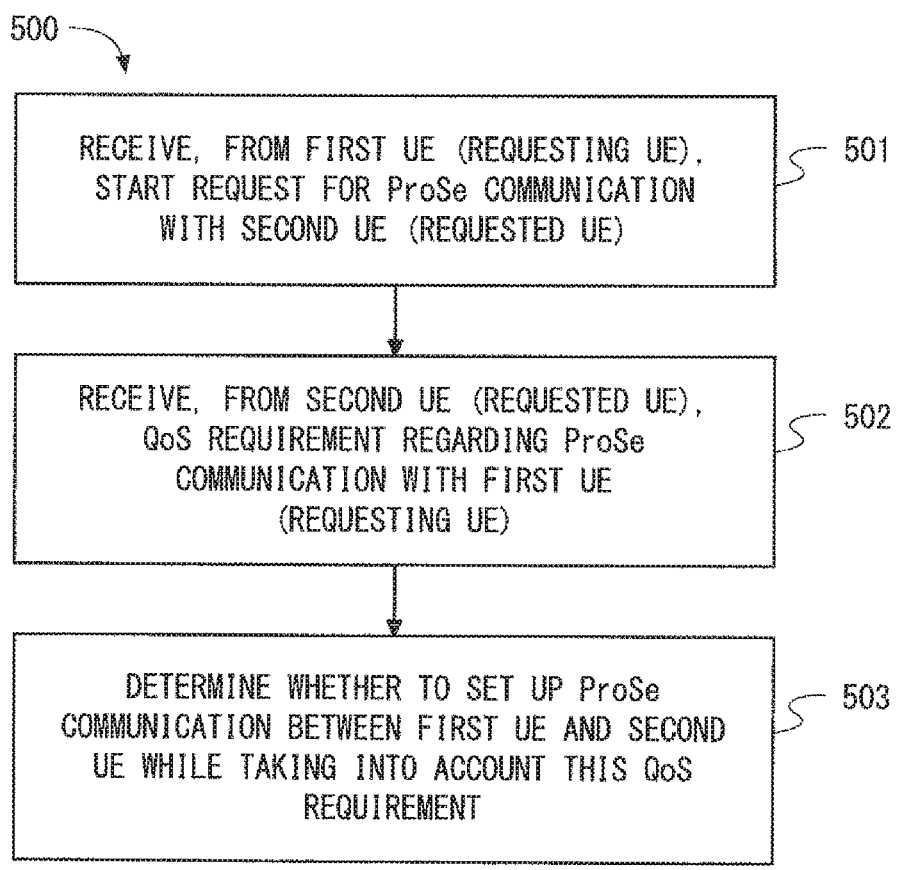
FIG. 5 is a flowchart showing an example of processes performed by a control apparatus according to a second embodiment.

FIG. 5 is a flowchart showing an example (500) of processes performed by the control apparatus 5. Similarly to Block 301 shown in FIG. 3, in Block 501, the control apparatus 5 receives from the UE 1 (requesting UE) a start request for ProSe communication between the UE 1 (requesting UE) and the UE 2 (requested UE). Similarly to Block 302 shown in FIG. 3, in Block 502, the control apparatus 5 receives a QoS requirement regarding the ProSe communication from the UE 2 (requested UE).

In Block 503, the control apparatus 5 determines whether to set up ProSe communication between the UE 1 and the UE 2 while taking into account the QoS requirement received from the UE 2 (requested UE). In some implementations, this determination may be made by comparing the QoS requirement received from the UE 2 with a radio condition between the UE 1 and the UE 2 estimated based on position information of the UE 1 and the UE 2.

Figure 6:
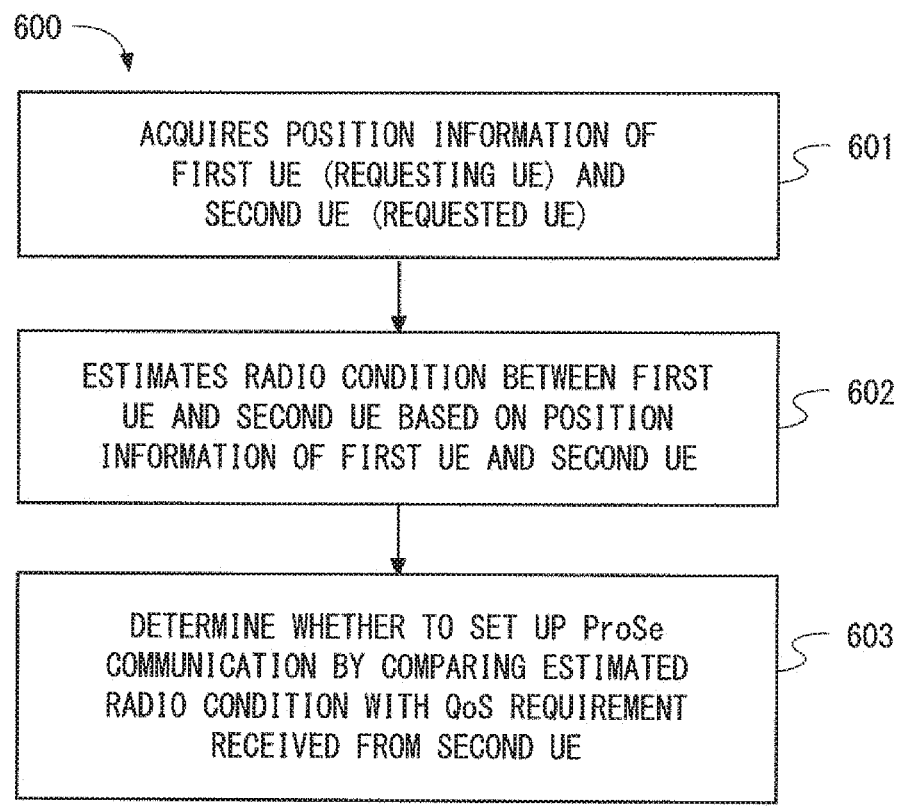
FIG. 6 is a flowchart showing an example of processes performed by a control apparatus according to the second embodiment.

FIG. 6 is a flowchart showing a specific example (processes 600) of the determination made in Block 503 shown in FIG. 5. In Block 601, the control apparatus 5 acquires position information of the UE 1 (requesting UE) and the UE 2 (requested UE). The control apparatus 5 may receive the position information from the UE 1 and the UE 2 or from a node located in the PLMN 100 (e.g., eNodeB 31, MME 43, or HSS 44). In some implementations, the position information of the UE 1 and the UE 2 may be position information obtained by global positioning system (GPS) receivers disposed in the UE 1 and the UE 2. In other examples, the position information of the UE 1 and the UE 2 may indicate a cell(s) 32 in which the UE 1 and the UE 2 are located (or an eNodeB(s) 31 to which the UE 1 and the UE 2 are connected).

In Block 602, the control apparatus 5 estimates a radio condition between the UE 1 and the UE 2 based on the position information of the UE 1 and the UE 2. The radio condition relates to, for example, at least one of a propagation loss and a propagation delay. The control apparatus 5 may use map data containing information about buildings and geographic features in order to accurately estimate the radio condition in view of the buildings and geographic features.

In Block 603, the control apparatus 5 determines whether to set up the ProSe communication between the UE 1 and the UE 2 by comparing the estimated radio condition with the QoS requirement received from the UE 2 (requested UE). Specifically, for example, if the radio condition is sufficient to meet the QoS requirement received from the UE 2 (requested UE), the control apparatus 5 determines to set up the ProSe communication.

Figure 7:
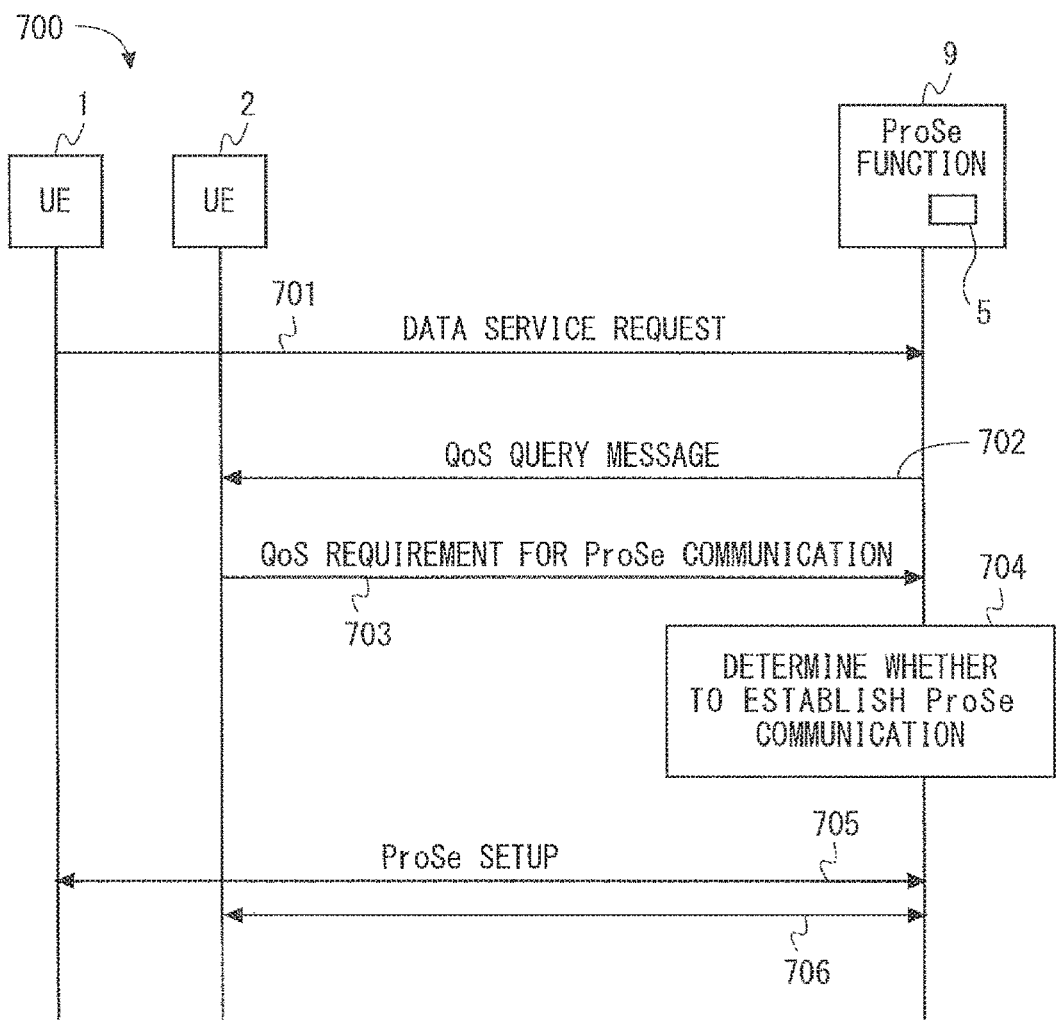
FIG. 7 is a sequence diagram showing an example of a process for setting up ProSe communication according to the second embodiment.

FIG. 7 is a sequence diagram showing an example (processes 700) of a process for setting up ProSe communication according to this embodiment. In Block 701, the UE 1 (requesting UE) requests a ProSe function entity 9 to provide a data service between the UE 1 (requesting UE) and the UE 2 (requested UE). The data service request in Block 701 includes an identifier of the UE 2 (requested UE). Note that the data service request is merely an example of a message requesting to start ProSe communication. As described previously, the message requesting to start ProSe communication may be other types of messages (e.g., a request for setting up ProSe discovery or a request for setting up a ProSe direct communication path).

In the example shown in FIG. 7, the control apparatus 5 is located in the ProSe function entity 9. In Block 702, the control apparatus 5 transmits a QoS query message to the UE 2 (requested UE). In Block 703, in response to the QoS query message, the UE 2 transmits a QoS requirement regarding ProSe communication to the control apparatus 5. In some implementations, the UE 2 may notify the control apparatus 5 of, as this QoS requirement, communication quality (e.g., throughput and a transmission delay) required by an application (e.g., instant messaging, voice chat, video chat, or online game) that communicates with the UE 1 (requesting UE) through the ProSe communication path 103 to the UE 1.

In Block 704, the control apparatus 5 (i.e., the ProSe function entity 9 in this example) determines whether to set up the ProSe communication between the UE 1 and the UE 2 while taking into account the QoS requirement received from the UE 2 (requested UE). Upon determining to set up the ProSe communication, the control apparatus 5 starts a procedure for setting up the ProSe communication (Block 705).

In this embodiment, the UE 2 serving as the requesting UE can notify the control apparatus 5 of its QoS requirement and, therefore, the control apparatus 5 can determine whether to set up the ProSe communication while taking into account the QoS requirement received from the UE 2 (requested UE).

Figure 8:
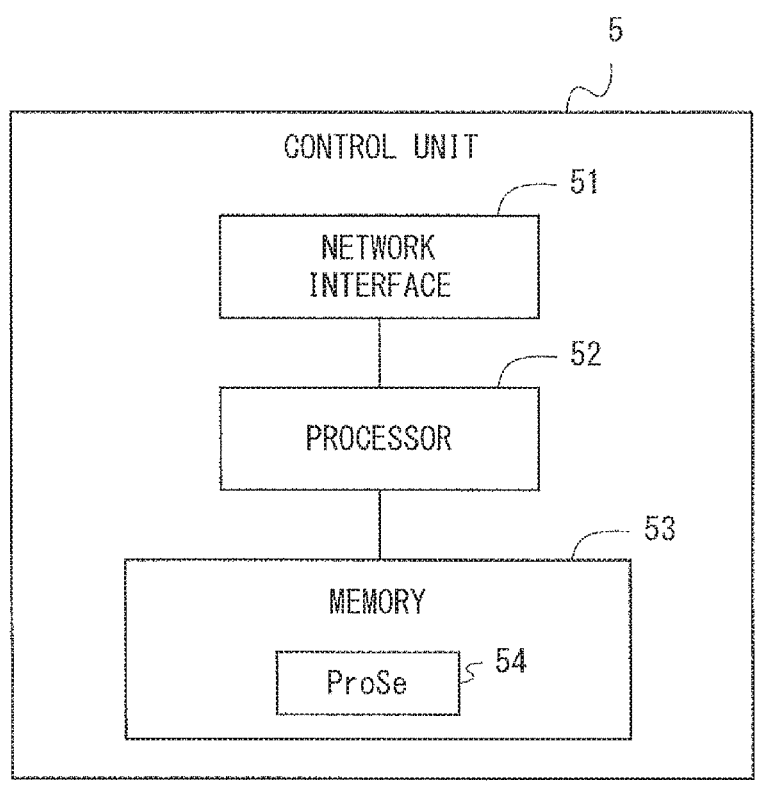
FIG. 8 is a block diagram showing a configuration example of a control apparatus.

Lastly, configuration examples of the control apparatus 5 and the UEs 1 and 2 according to the above-described embodiments are explained. FIG. 8 shows a configuration example of the control apparatus 5. Referring to FIG. 8, the control apparatus 5 includes a network interface 51, a processor 52, and a memory 53. The network interface 51 is used to communicate with a network node (e.g., MME 43 and ProSe function entity 9). The network interface 51 may include, for example, a Network Interface Card (NIC) conforming to the IEEE 802.3 series.

The processor 52 loads software (computer program) from the memory 53 and executes these loaded software, and thereby performs processes of the control apparatus 5 related to the processes 300, 400, 500, 600 or 700 explained in the above-described embodiments. The processor 52 may be, for example, a microprocessor, a Micro Processing Unit (MPU), or a Central Processing Unit (CPU). The processor 52 may include a plurality of processors.

The memory 53 consists of a volatile memory and a nonvolatile memory. The volatile memory is, for example, a Static Random Access Memory (SRAM), a Dynamic RAM (DRAM), or a combination of them. The nonvolatile memory is, for example, a Mask Read Only Memory (MROM), a Programmable ROM (PROM), a flash memory, a hard disk drive, or any combination of them. The memory 53 may include a storage that is remotely arranged from the processor 52. In this case, the processor 52 may access the memory 53 through the network interface 51 or an I/O interface (not shown).

In the example shown in FIG. 8, the memory 53 is used to store software modules including a ProSe module 54. The ProSe module 54 includes instructions and data necessary for performing processes of the control apparatus 5 related to the processes 300, 400, 500, 600 or 700 explained in the above-described embodiments. The processor 52 loads software modules including the ProSe module 54 from the memory 53 and executes these loaded modules, and thereby performing the processes of the control apparatus 5 explained in the above-described embodiments.

Figure 9:
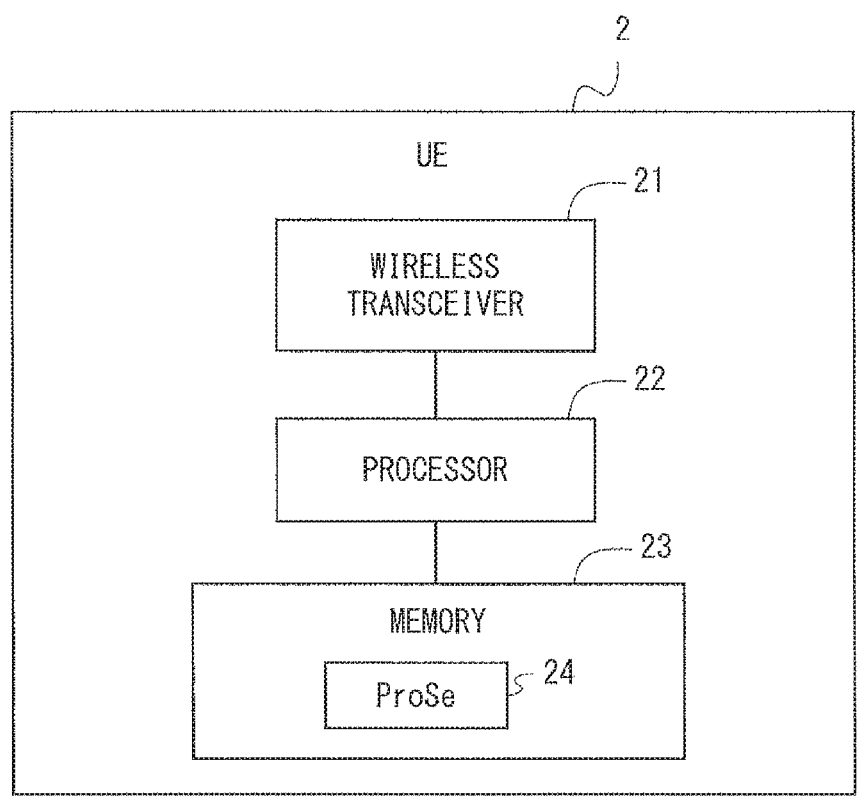
FIG. 9 is a block diagram showing a configuration example of a radio terminal.

FIG. 9 shows a configuration example of the UE 2 (requested UE). The UE 1 may have a configuration similar to that of the UE 2. Referring to FIG. 9, the UE 2 includes a wireless transceiver 21, a processor 22, and a memory 23. The wireless transceiver 21 is used for communication (102 in FIGS. 1 and 2) with the E-UTRAN 3 (eNodeB 31) and for ProSe direct communication (103 in FIGS. 1 and 2). The wireless transceiver 21 may include a plurality of transceivers, for example, an E-UTRA (Long Term Evolution (LTE)) transceiver and a WLAN transceiver.

The processor 22 loads software (a computer program) from the memory 23 and executes this loaded software, and thereby performs processes of the UE 2 related to the processes 300, 400, 500, 600 or 700 explained in the above-described embodiments. The processor 22 may be, for example, a microprocessor, an MPU, or a CPU. The processor 22 may include a plurality of processors.

The memory 23 consists of a volatile memory and a nonvolatile memory. The volatile memory is, for example, an SRAM, a DRAM, or a combination of them. The nonvolatile memory is, for example, an MROM, a PROM, a flash memory, a hard disk drive, or any combination of them. The memory 23 may include a storage that is located apart from the processor 22. In this case, the processor 22 may access the memory 23 through an I/O interface (not shown).

In the example shown in FIG. 9, the memory 23 is used to store software modules including a ProSe module 24. The ProSe module 24 includes instructions and data necessary for performing processes of the UE 2 related to the processes 300, 400, 500, 600 or 700 explained in the above-described embodiments. The processor 22 loads software modules including the ProSe module 24 from the memory 23 and executes these loaded modules, and thereby performing the processes of the UE 2 explained in the above-described embodiments.

As explained above with reference to FIGS. 8 and 9, each of the processors included in the control apparatus 5 and the UEs 1 and 2 according to the above-described embodiments executes one or more programs including instructions to cause a computer to perform an algorithm explained with reference to the drawings. These programs can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs can be supplied to a computer by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or through a wireless communication path.

Other Embodiments

Each of the above-described embodiments may be used individually, or two or more of the embodiments may be appropriately combined with one another.

The above-described embodiments provide examples in which the control apparatus 5 is located in the ProSe function entity 9. However, as described previously, the control apparatus 5 may be located in a node within the PLMN 100 (e.g., eNodeB 31, MME 43, or HSS 44).

The above-described embodiments are explained by using specific examples mainly related to the EPS. However, these embodiments may be applied to other mobile communication systems such as a Universal Mobile Telecommunications System (UMTS), a 3GPP2 CDMA2000 system (1×RTT, High Rate Packet Data (HRPD)), a Global System for Mobile communications (GSM)/General packet radio service (GPRS) system, and a mobile WiMAX system.

Further, the above-described embodiments are merely examples of applications of the technical ideas obtained by the inventor. Needless to say, these technical ideas are not limited to the above-described embodiments and various modifications can be made thereto.

This application is based upon and claims the benefit of priority from Japanese patent application No. 2014-228041, filed on Nov. 10, 2014, the disclosure of which is incorporated herein in its entirety by reference.

REFERENCE SIGNS LIST

1 UE
2 UE
3 E-UTRAN
4 EPC
5 CONTROL APPARATUS
9 ProSe FUNCTION ENTITY
31 eNodeB
32 CELL
100 PLMN
103 ProSe COMMUNICATION PATH

The invention claimed is:

1. A method performed by a control apparatus, the method comprising:
receiving from a first radio terminal, through a public land mobile network, a start request for Proximity Service (ProSe) communication that is to be performed between the first radio terminal and a second radio terminal without communicating through the public land mobile network;
receiving, from the second radio terminal, a Quality of Service (QoS) requirement regarding the ProSe communication, the QoS requirement being required by the second radio terminal for the ProSe communication to be started between the first and second radio terminals in response to the start request sent by the first radio terminal;
acquiring position information of the first and second radio terminals;
estimating a radio condition between the first radio terminal and the second radio terminal based on the position information; and
comparing the QoS requirement with the radio condition to determine whether to set up the ProSe communication, wherein
the estimating includes using map data to take account of buildings and geographic features in the estimation of the radio condition.

2. A control apparatus comprising:
at least one memory that stores a set of instructions; and
at least one processor configured to execute the set of instructions to:
receive from a first radio terminal, through a public land mobile network, a start request for Proximity Service (ProSe) communication that is to be performed between the first radio terminal and a second radio terminal without communicating through the public land mobile network;
receive, from the second radio terminal, a Quality of Service (QoS) requirement regarding the ProSe communication, the QoS requirement being required by the second radio terminal for the ProSe communication to be started between the first and second radio terminals in response to the start request sent by the first radio terminal;
acquire position information of the first and second radio terminals;
estimate a radio condition between the first radio terminal and the second radio terminal based on the position information; and
compare the QoS requirement with the radio condition to determine whether to set up the ProSe communication, wherein
the at least one processor is configured to execute the set of instructions to use map data to take account of buildings and geographic features in the estimation of the radio condition.

3. The control apparatus according to claim 2, wherein the QoS requirement is requested by a service or an application using the ProSe communication in the second radio terminal.

4. The control apparatus according to claim 2, wherein the QoS requirement is requested by application software, the application software being installed in the second radio terminal and adapted to perform communication by using the ProSe communication.

5. The control apparatus according to claim 2, wherein the QoS requirement relates to at least one of an amount of transmission data, throughput, and a transmission delay.

6. The control apparatus according to claim 2, wherein the QoS requirement is used in the control apparatus to determine whether to set up the ProSe communication.

7. The control apparatus according to claim 2, wherein the start request includes an identifier of the second radio terminal, and
the at least one processor is configured to execute the set of instructions to, in response to the start request, request the second radio terminal to transmit the QoS requirement.

8. The control apparatus according to claim 2, wherein the radio condition relates to at least one of a propagation loss and a propagation delay.

9. The control apparatus according to claim 2, wherein the start request includes at least one of a request for a data service, a request for a telephone call, a request for setting up ProSe discovery, a request for setting up a ProSe direct communication path, and a request for allocating a radio resource for a ProSe direct communication path.

10. The control apparatus according to claim 2, wherein a setup of the ProSe communication includes at least one of a setup of ProSe discovery, a setup of ProSe direct communication, allocation of a radio resource for ProSe direct communication, and assistance in establishing a ProSe communication path.

11. The control apparatus according to claim 2, wherein the control apparatus is located in a base station within the public land mobile network.

12. The control apparatus according to claim 2, wherein
the public land mobile network includes a radio access network and a core network, and
the control apparatus is configured to communicate with the first and second radio terminals through the radio access network and the core network.

* * * * *